(12) United States Patent  
Nakanishi et al.

(10) Patent No.: US 9,764,770 B2  
(45) Date of Patent: Sep. 19, 2017

(54) STRUCTURE FOR UPPER PART OF VEHICLE BODY

(71) Applicant: HONDA MOTOR CO., LTD., Tokyo (JP)

(72) Inventors: Yukinobu Nakanishi, Saitama (JP); Sadayuki Asano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/037,400

(22) PCT Filed: Nov. 14, 2014

(86) PCT No.: PCT/JP2014/080191  
§ 371 (c)(1),  
(2) Date: May 18, 2016

(87) PCT Pub. No.: WO2015/076195  
PCT Pub. Date: May 28, 2015

(65) Prior Publication Data  
US 2016/0288841 A1  Oct. 6, 2016

(30) Foreign Application Priority Data  
Nov. 19, 2013  (JP) .................................. 2013-238837

(51) Int. Cl.  
*B62D 27/02* (2006.01)  
*B62D 25/06* (2006.01)  
*B62D 25/04* (2006.01)

(52) U.S. Cl.  
CPC ............. *B62D 25/06* (2013.01); *B62D 25/04* (2013.01); *B62D 27/02* (2013.01); *B62D 27/023* (2013.01)

(58) Field of Classification Search  
CPC ...... B62D 25/06; B62D 27/023; B62D 27/02; B62D 25/04  
(Continued)

(56) References Cited

U.S. PATENT DOCUMENTS 5,873,618 A * 2/1999 Ejima .................. B62D 25/06  
                                                          296/30  
2012/0153676 A1   6/2012 Shono  
(Continued)

FOREIGN PATENT DOCUMENTS

CN        1746066       3/2006  
CN      201784697       4/2011  
(Continued)

OTHER PUBLICATIONS

International Search Report, Date of mailing: Feb. 10, 2015 (Feb. 10, 2015).  
Chinese Office Action dated Feb. 27, 2017.

*Primary Examiner* — Jason S Morrow  
*Assistant Examiner* — E Turner Hicks  
(74) *Attorney, Agent, or Firm* — Rankin, Hill & Clark LLP (57) ABSTRACT

A structure for an upper part of vehicle body includes: right and left side rail members extending in a vehicle front-rear direction; a roof member having right and left end portions in a vehicle width direction supported by the right and left side rail members, respectively; and gussets connected at one ends thereof to the respective side rail members, each extending from one end upwardly and inwardly in the vehicle width direction, and connected at the other end thereof to the roof member.

4 Claims, 6 Drawing Sheets

(58) Field of Classification Search
USPC .................................. 296/203.03, 187.13, 30
See application file for complete search history.

(56) References Cited

U.S. PATENT DOCUMENTS

| | | | | |
|---|---|---|---|---|
| 2013/0082484 A1* | 4/2013 | Wagner | .................. | B62D 25/06 296/210 |
| 2013/0119647 A1* | 5/2013 | Tanaka | ................... | B62D 25/04 280/730.1 |
| 2015/0367794 A1* | 12/2015 | Nishimura | ............. | B62D 25/04 296/187.13 |

FOREIGN PATENT DOCUMENTS

| | | | |
|---|---|---|---|
| DE | 10107968 | | 8/2002 |
| JP | 10-016816 | | 1/1998 |
| JP | 10016816 | * | 1/1998 |
| JP | 10-167114 | | 6/1998 |
| JP | 2001-233243 | | 8/2001 |
| WO | 2009/020224 | | 2/2009 |

* cited by examiner

STRUCTURE FOR UPPER PART OF VEHICLE BODY

TECHNICAL FIELD

The present invention relates to a structure for upper part of vehicle body of a vehicle such as, for example, an automobile.

BACKGROUND ART

Figure 6:
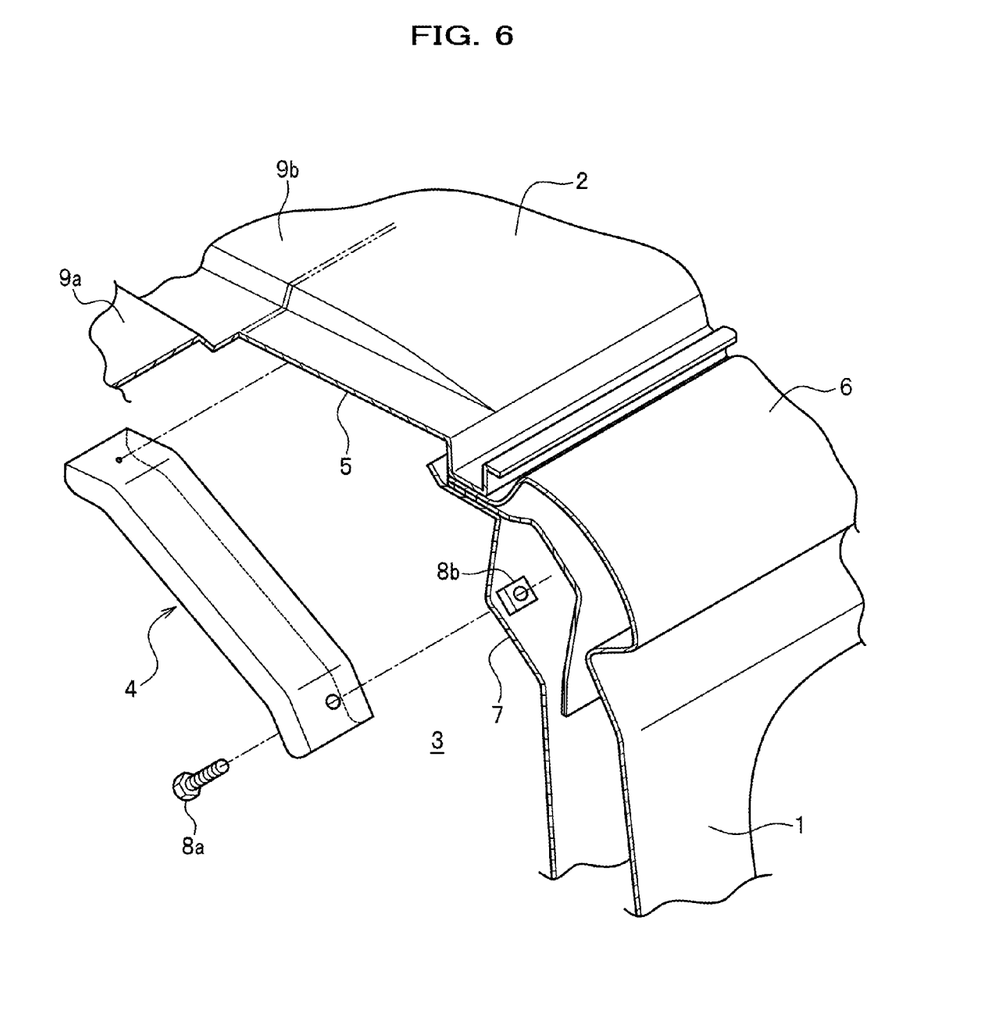
FIG. 6 is a partially exploded perspective cut view showing a roof structure according to a conventional technique.

For example, Patent Literature 1 discloses a roof structure, as shown in FIG. 6, in which a joint bracket 4 is provided to a corner portion at an inner side 3 of a vehicle compartment where a center pillar 1 at a side part of the vehicle body is connected to a roof panel 2 at an upper part of the vehicle body.

This joint bracket 4 has: one end (upper end) joined by welding to a lower surface of a bead part 5 provided to the roof panel 2; and the other end (lower end) fastened, with a bolt 8a and a nut 8b, to a single inner panel 7 constituting a closed cross section of a roof side member 6. Note that the bead part 5 has such a sectional shape that the roof panel 2 is divided into two tensile surfaces 9a, 9b, forming a recessed groove open outwardly of the vehicle compartment.

CITATION LIST

Patent Literature

Patent Literature 1: JP 2001-233243 A

SUMMARY OF INVENTION

Technical Problem

However, in the roof structure disclosed in Patent Literature 1, the roof panel 2 is a member constituting a design surface of the vehicle, and providing the bead part 5 having the recessed groove, as seen from the outside of the vehicle compartment, decreases the design appearance. Moreover, since the one end (upper end) of the joint bracket 4 is directly welded to the lower surface of the bead part 5, a welding mark resulting from the welding is visible on the design surface of the roof from the outside of the vehicle compartment, and the roof panel 2 may be thermally strained by the heating action during the welding.

Further, suppose a case where the roof design is developed which, for example, excludes the bead part 5 but includes the roof panel 2 having a single tensile surface in consideration of the design. In this case, the single roof panel 2, to which the one end (upper end) of the joint bracket 4 is joined, does not have a sufficient strength. This brings about a problem that the stiffness and the strength of the upper part of the vehicle body deteriorate.

Furthermore, since the other end (lower end) of the joint bracket 4 is bolt-fastened to the single inner panel 7 with the bolt 8a and the nut 8b, the single inner panel 7 does not have a sufficient strength, either, as in the case of the one end. This brings about the problem that the stiffness and the strength of the upper part of the vehicle body deteriorate.

An object of the present invention is to provide a structure for upper part of vehicle body capable of ensuring the stiffness and the strength at a corner portion inside a vehicle compartment where a roof member is connected to a pillar, without deteriorating the design.

Solution to Problem

To achieve the above object, the present invention is a structure for upper part of vehicle body characterized as follows. The structure for upper part of vehicle body includes: a pair of right and left side rail members extending in a vehicle front-rear direction; a roof member having right and left end portions in a vehicle width direction supported by the pair of side rail members respectively; and gussets connected at one ends thereof to the respective side rail members, extended from the one ends upwardly and inwardly in the vehicle width direction, and connected at the other ends thereof to the roof member. The roof member includes: a roof panel constituting a design surface; a roof arch disposed below the roof panel and extending in the vehicle width direction between the pair of side rail members; and roof stiffeners disposed below the roof arch and disposed on inner sides of the respective side rail members in the vehicle width direction to extend in the vehicle front-rear direction along the respective side rail members, the roof stiffeners being connected to outer end portions of the roof arch in the vehicle width direction and constituting a first closed cross section. The other end of each gusset is connected to the roof stiffener, forming a second closed cross section adjacent to the first closed cross section.

According to the present invention, the roof arch and the roof stiffener form the first closed cross section, while the side rail member, the roof stiffener, and the gussets form the second closed cross section. These first closed cross section and second closed cross section are disposed adjacent to each other. In the load transmission in the vehicle width direction between the side rail member and the roof member, a load is transmitted through the two adjacent closed cross sections. As a result, the present invention enhances the load transmission efficiency in the vehicle width direction, making it possible to increase the stiffness and the strength of the upper part of the vehicle body.

Moreover, according to the present invention, it is no longer necessary to provide a bead part having a recessed groove as in the conventional technique, and the gusset is not directly connected to the roof panel constituting the design surface. Accordingly, it is possible to ensure the stiffness and the strength at a corner portion inside a vehicle compartment where the roof member is connected to a pillar, without deteriorating the design.

Further, the present invention is characterized as follows. Each roof stiffener has a hat-shaped cross-sectional portion formed of: a lower wall facing the roof panel in an up-down direction; an outer wall and an inner wall raised upwardly from the lower wall and facing each other in the vehicle width direction; an outer flange extending from an upper end of the outer wall outwardly in the vehicle width direction; and an inner flange extending from an upper end of the inner wall inwardly in the vehicle width direction. The outer flange of the roof stiffener is connected to an outer end portion of the roof panel in the vehicle width direction. The roof arch has: an arch main body connected to a lower surface of the roof panel; an arch curved portion formed by downwardly curving a portion of the arch main body, the portion being inward in the vehicle width direction of the outer end portion of the roof panel in the vehicle width direction; and an arch connection portion extending from a lower end of the arch curved portion outwardly in the vehicle width direction and connected to the outer flange of the roof stiffener. The roof panel, the arch curved portion and the arch connection portion of the roof arch, and the outer flange of the roof stiffener form a third closed cross section overlapping with the second closed cross section in the up-down direction of the vehicle.

According to the present invention, by forming the third closed cross section overlapping with the second closed cross section in the vehicle up-down direction, a load is transmitted in the vehicle width direction between the side rail member and the roof member through the first closed cross section, the second closed cross section, and the third closed cross section. As a result, the present invention further enhances the load transmission efficiency in the vehicle width direction, making it possible to further increase the stiffness and the strength of the upper part of the vehicle body.

Further, the present invention is characterized in that the third closed cross section is formed to overlap with the first closed cross section in the up-down direction of the vehicle with the roof arch therebetween.

According to the present invention, the first closed cross section and the second closed cross section are disposed adjacent to each other, and the third closed cross section is disposed to overlap with each of the first closed cross section and the second closed cross section in the vehicle up-down direction. With such positional relations that the first closed cross section, the second closed cross section, and the third closed cross section are adjacent to each other or overlap with each other in the up-down direction, efficient load transmissions are possible among the multiple closed cross sections, and the stiffness and the strength of the upper part of the vehicle body can be further increased.

Furthermore, the present invention is characterized in that each of the side rail members has: a rail inner connected to the one end of the gusset; and a rail outer connected to an outer side of the rail inner in the vehicle width direction, the rail inner and the rail outer forming a fourth closed cross section adjacent to the second closed cross section.

According to the present invention, by forming the fourth closed cross section adjacent to the second closed cross section, a load is transmitted in the vehicle width direction between the side rail member and the roof member through the first closed cross section, the second closed cross section, and the fourth closed cross section which are adjacent to each other. As a result, the present invention enhances the load transmission efficiency in the vehicle width direction, making it possible to further increase the stiffness and the strength of the upper part of the vehicle body.

Furthermore, the present invention is characterized by further including a pillar extending in the up-down direction of the vehicle and having an upper end connected to each of the side rail members, the pillar being disposed at a position overlapping with the gusset and the roof arch in the vehicle width direction in a top view of a vehicle body.

According to the present invention, the pillar, the gusset, and the roof arch are positioned to overlap with each other in the vehicle width direction when seen from the top, so that the pillar overlaps with the first to the fourth closed cross sections in the vehicle width direction. As a result, the present invention enhances the load transmission efficiency in the vehicle width direction from the pillar through the side rail member to the roof member, making it possible to further increase the stiffness and the strength of the side part and the upper part of the vehicle body.

In addition, according to the present invention, for example, a side impact load inputted to the pillar can be efficiently transmitted to the upper part of the vehicle body, thus enhancing the side impact performance. Further, a rollover load inputted to the roof member can be efficiently transmitted to the side part of the vehicle body, thus enhancing the rollover performance. Furthermore, when the vehicle turns a corner, a deformation load (deformation mode) or the like inputted to the pillar and the roof member can be spread to each of the upper part and the side part of the vehicle body, thus enhancing the deformation mode performance.

Note that, in the present invention, "connecting" and related similar terms used are meant to include, for example, "joining" by welding, adhesion, or the like, and "fastening" with bolt and nut, stud bolt, or the like.

Advantageous Effects of Invention

According to the present invention, it is made possible to obtain a structure for upper part of vehicle body capable of ensuring the stiffness and the strength at a corner portion inside a vehicle compartment where a roof is connected to a pillar, without deteriorating the design.

DESCRIPTION OF EMBODIMENTS

Hereinafter, embodiments of the present invention will be described in detail with reference to the accompanying drawings as appropriate. Note that "front or rear" and "upper or lower," indicated by the arrows in each drawing, indicate a front-rear direction and an up-down direction (vertical up-down direction) of the vehicle respectively, while "right or left" indicate a right-left direction (vehicle width direction) of the vehicle. Moreover, in the present embodiments, "connecting" between members is exemplified by, for example, "joining" by welding, adhesion, or the like, and "fastening" with bolt and nut, stud bolt, or the like, but is not limited thereto.

Figure 1:
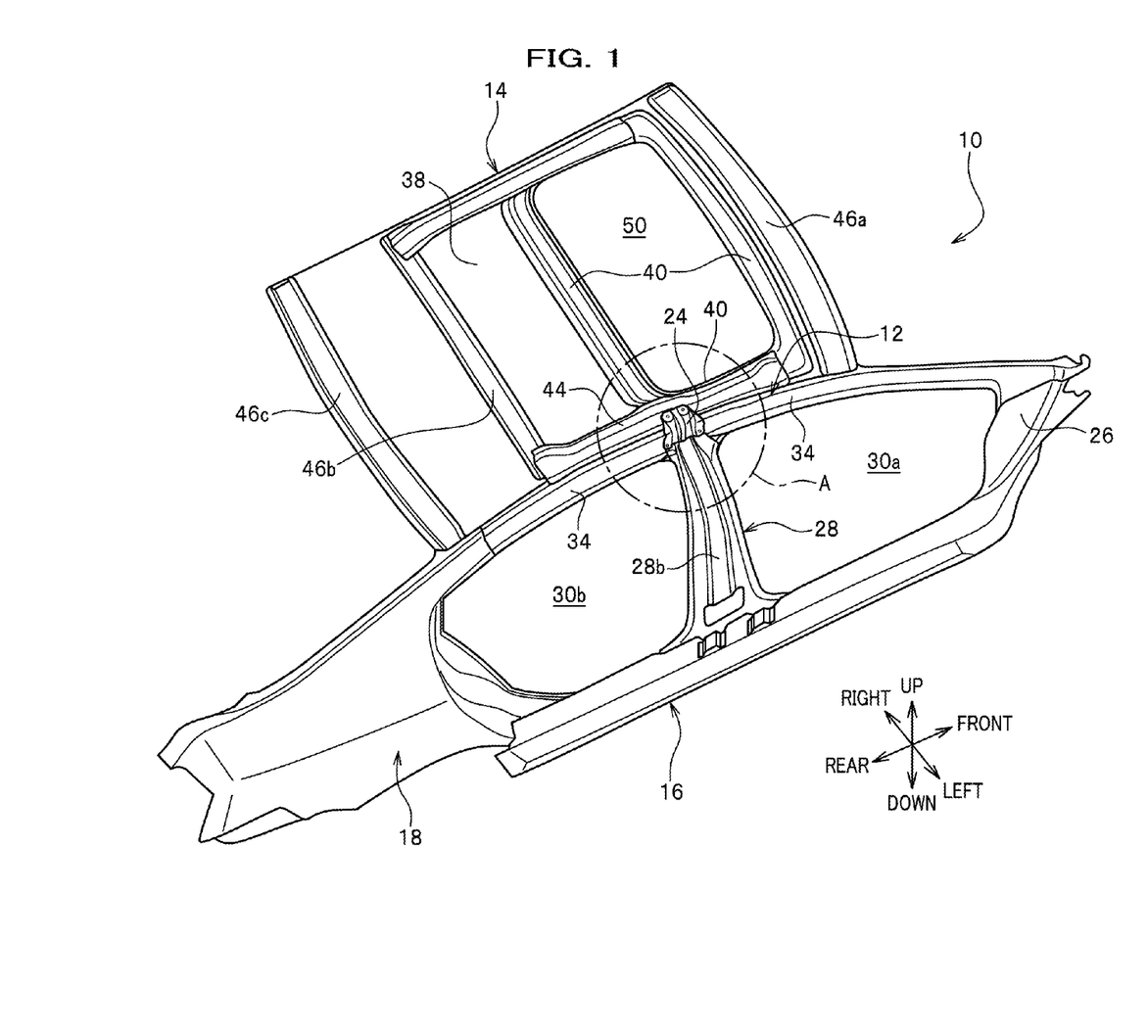
FIG. 1 is a perspective view from an inside of a left side part and an upper part of a vehicle having a structure for upper part of vehicle body according to an embodiment of the present invention.

As shown in FIG. 1, a vehicle 10 having a structure for upper part of vehicle body according to an embodiment of the present invention includes: a pair of right and left side rail members 12 extending in the vehicle front-rear direction; a roof member 14 having right and left end portions in the vehicle width direction supported by the pair of side rail members 12 respectively; a pair of right and left side sills 16 extending in the vehicle front-rear direction below the pair of side rail members 12; and side panel parts 18 provided between corresponding pairs of the side rail members 12 and the side sills 16. Note that, in the present embodiment, a left side part of the vehicle 10 will be described in detail, and the description of a right side part disposed symmetrically to the left side part will be omitted.

Figure 2:
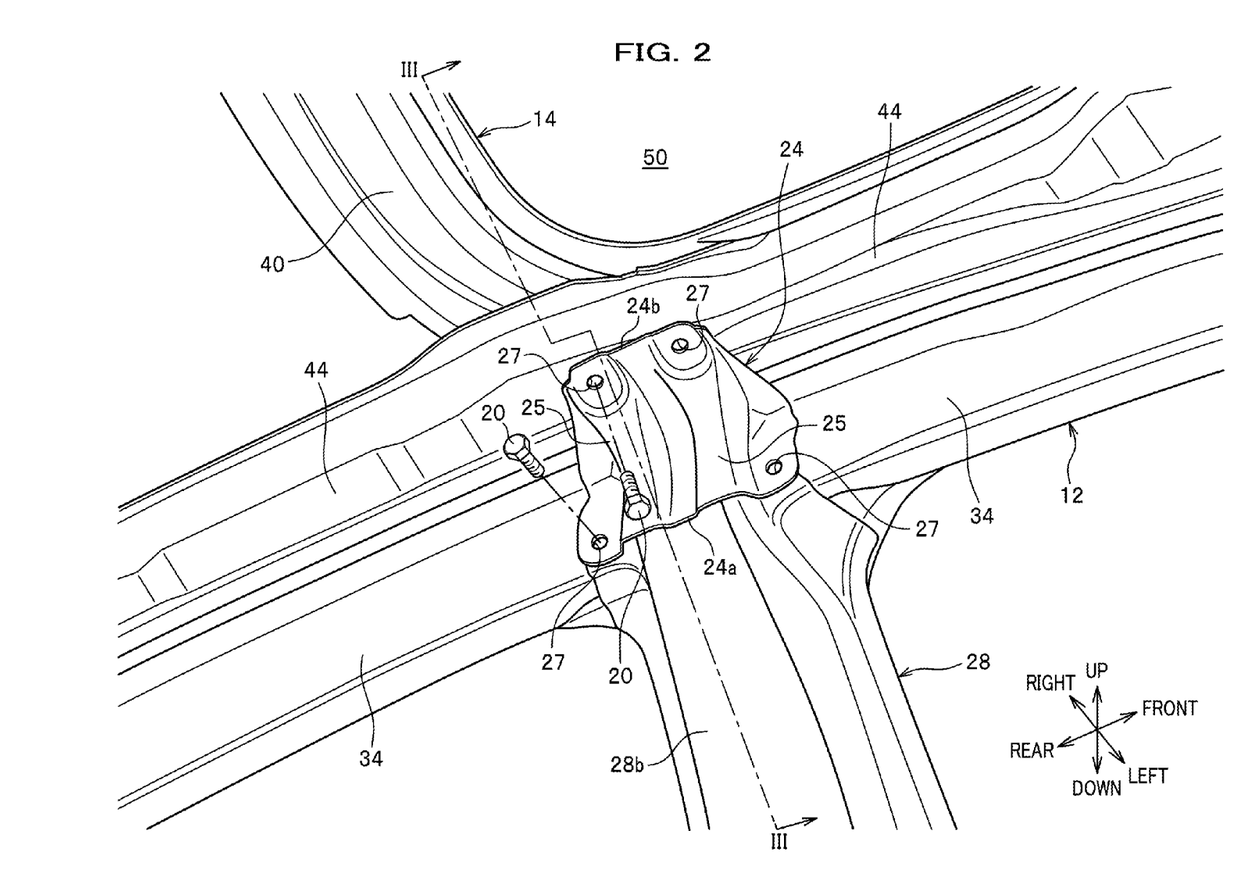
FIG. 2 is a partially enlarged perspective view of a section A shown in FIG. 1.
Figure 4:
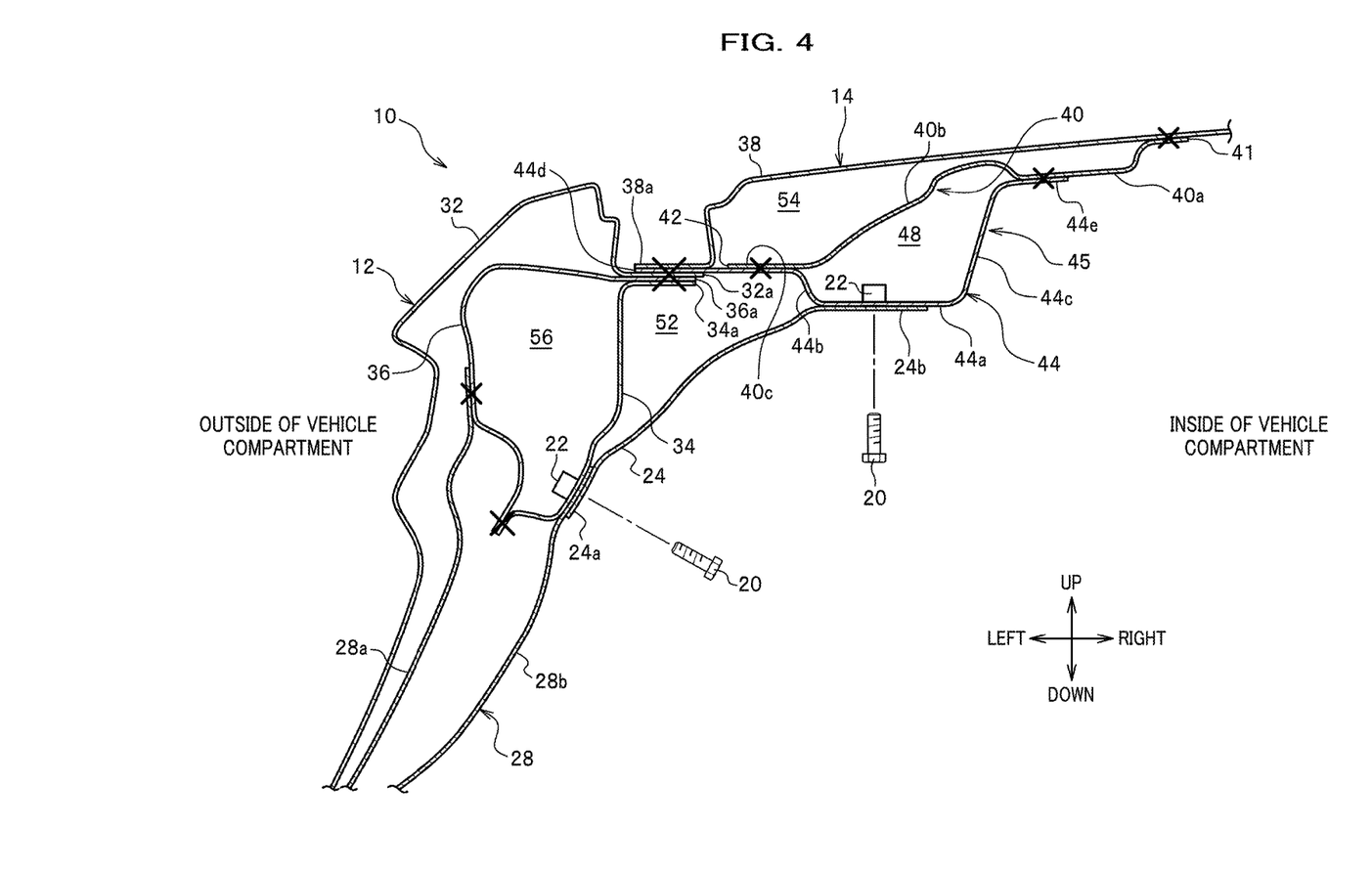
FIG. 4 is an end view taken along the line in FIG. 2.

As shown in FIG. 2, the vehicle 10 further includes a gusset 24 fastened at a lower end (one end) 24a thereof to one of the side rail members 12, extended from the lower end (one end) 24*a* upwardly and inwardly in the vehicle width direction, and fastened at an upper end (the other end) thereof to the roof member 14, with bolts 20 and nuts 22 (see FIG. 4). The gusset 24 is provided with: a pair of reinforcement ribs 25 formed to expand inwardly to a vehicle compartment and extending substantially in parallel to each other along the vehicle up-down direction; and bolt insertion holes 27 disposed in four corner portions.

Returning to FIG. 1, a front portion of the vehicle is provided with a front pillar 26 suspended between the left side rail member 12 and the left side sill 16. Moreover, provided between the front pillar 26 and the side panel part 18 is a center pillar (pillar) 28 extending in the vehicle up-down direction and having an upper end joined (connected) to the left side rail member 12 and a lower end joined to the side sill 16.

Figure 3:
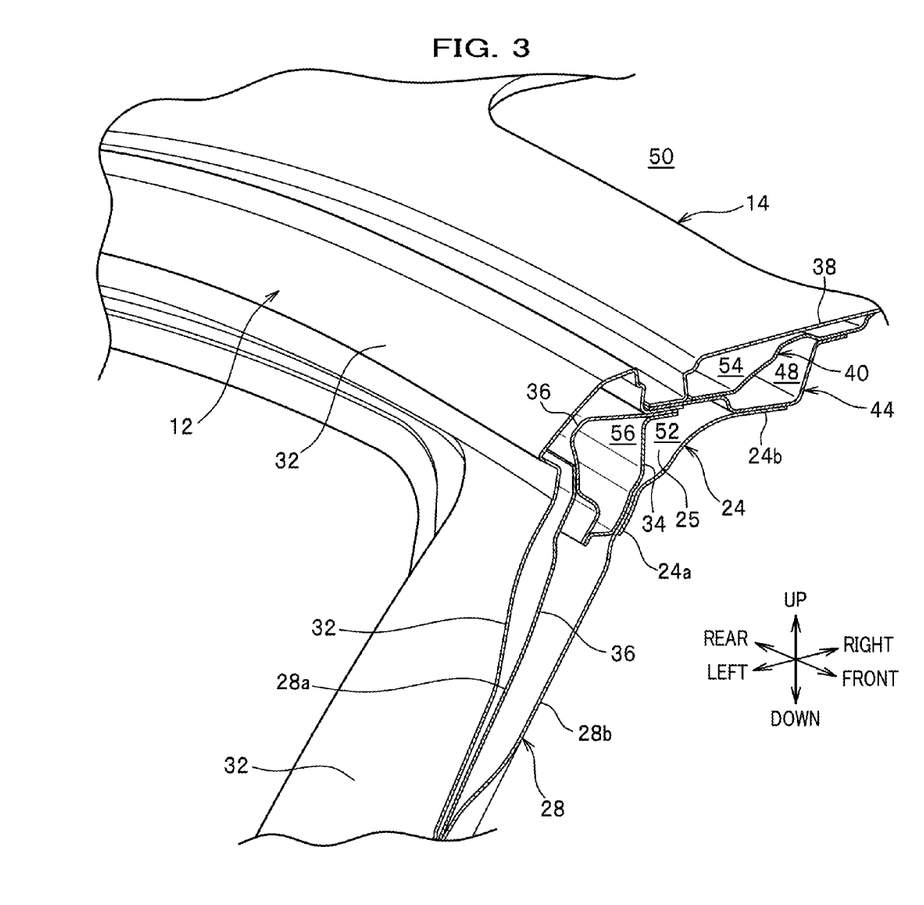
FIG. 3 is a perspective view including a vertical cross section taken along the line in FIG. 2.

As shown in FIGS. 3 and 4, the center pillar 28 includes an outer pillar 28*a* located outside the vehicle compartment, and an inner pillar 28*b* located inside the vehicle compartment. An upper end of the outer pillar 28*a* is joined (welded) to a rail outer 36 to be described below, while the inner pillar 28*b* is fixed with the bolts 20 and the nuts 22 by fastening together with the gusset 24 and a rail inner 34. The center pillar 28 divides a left front door opening portion 30 and a left rear door opening portion 30*b* from each other (see FIG. 1).

As shown in FIGS. 3 and 4, the left side rail member 12 has: a side outer panel 32 located at the outermost side of the vehicle compartment and exposed to the outside of the vehicle compartment; the rail inner 34 to which the lower end (one end) 24*a* of the gusset 24 along the vehicle up-down direction is fastened (connected) with the bolts 20 and the nuts 22; and the rail outer 36 joined to an outer side of the rail inner 34 in the vehicle width direction.

As shown in FIGS. 3 and 4, the roof member 12 includes: a roof panel 38 constituting a design surface facing the outside of the vehicle compartment; a roof arch 40 disposed below the roof panel 38 in the vehicle up-down direction and extending in the vehicle width direction between the left side rail members 12; a roof stiffener 44 disposed below the roof arch 40 in the vehicle up-down direction and disposed on an inner side of the left side rail member 12 in the vehicle width direction to extend in the vehicle front-rear direction along the left side rail member 12, the roof stiffener 44 being joined (welded) to an outer end portion 42 of the roof arch 40 in the vehicle width direction; and multiple roof cross members 46*a* to 46*c* extending along the vehicle width direction and joined to the pair of side rail members 12 (see FIG. 1).

As shown in FIG. 1, a substantially rectangular-shaped sunroof opening portion 50 is formed in a vehicle-front portion of the roof member 12. The roof arch 40 is provided to surround the sunroof opening portion 50 when seen from the inside of the vehicle compartment.

As shown in FIGS. 3 and 4, the roof stiffener 44 has a hat-shaped cross-sectional portion 45 formed of: a lower wall 44*a* facing the roof panel 38 in the vehicle up-down direction; an outer wall 44*b* and an inner wall 44*c* raised upwardly from the lower wall 44*a* and facing each other in the vehicle width direction; an outer flange 44*d* extending from an upper end of the outer wall 44*b* outwardly in the vehicle width direction; and an inner flange 44*e* extending from an upper end of the inner wall 44*c* inwardly in the vehicle width direction. The outer flange 44*d* of the roof stiffener 44 is joined (welded) to an outer end portion 38*a* of the roof panel 38 in the vehicle width direction. Note that, in the vehicle up-down direction, the height dimension of the inner wall 44*c* is set higher than the height dimension of the outer wall 44*b*.

At this joined portion, five panel end portions are stacked in the vehicle up-down direction and integrally joined (welded) to each other including, in the order of stacking from the uppermost layer toward the lowermost layer: the outer end portion 38*a* of the roof panel 38 in the vehicle width direction, the outer flange 44*d* of the roof stiffener 44, an inner end portion 32*a* of the side panel outer 32 in the vehicle width direction, an inner end portion 36*a* of the rail outer 36 in the vehicle width direction, and an inner end portion 34*a* of the rail inner 34 in the vehicle width direction.

A first closed cross section 48 is formed between the roof arch 40 and the roof stiffener 44, which are respectively located at an upper side and a lower side in the vehicle up-down direction. The first closed cross section 48 has a substantially triangular shape in the cross-sectional view, and is provided to extend along the vehicle front-rear direction.

The roof arch 40 has: an arch main body 40*a* having an upper flange 41 connected to a lower surface of the roof panel 38; an arch curved portion 40*b* formed by downwardly curving a portion of the arch main body 40*a*, the portion being inward in the vehicle width direction of the outer end portion 38*a* of the roof panel 38 in the vehicle width direction; and an arch connection portion 40*c* extending from a lower end of the arch curved portion 40*b* outwardly in the vehicle width direction and joined (welded) to the outer flange 44*d* of the roof stiffener 44. Note that the arch connection portion 40*c* is provided not to overlap, in the vehicle width direction, with the outer end portion 38*a* of the roof panel 38 in the vehicle width direction.

The upper end (the other end) 24*b* of the gusset 24 is fastened (connected) to the lower wall 44*a* of the roof stiffener 44 with the bolts 20 and the nuts 22, thereby forming a second closed cross section 52 adjacent to the first closed cross section 48 along the vehicle width direction. The second closed cross section 52 is formed substantially in a right triangle shape in the cross-sectional view.

The roof panel 38, the arch curved portion 40*b* and the arch connection portion 40*c* of the roof arch 40, and the outer flange 44*d* of the roof stiffener 44 form a third closed cross section 54 overlapping with the second closed cross section 52 in the vehicle up-down direction. The third closed cross section 54 is formed to overlap with the first closed cross section 48 in the vehicle up-down direction with the roof arch 40 therebetween. Moreover, the rail inner 34 and the rail outer 36 form a fourth closed cross section 56 adjacent to the second closed cross section 52 along the vehicle width direction.

Figure 5:
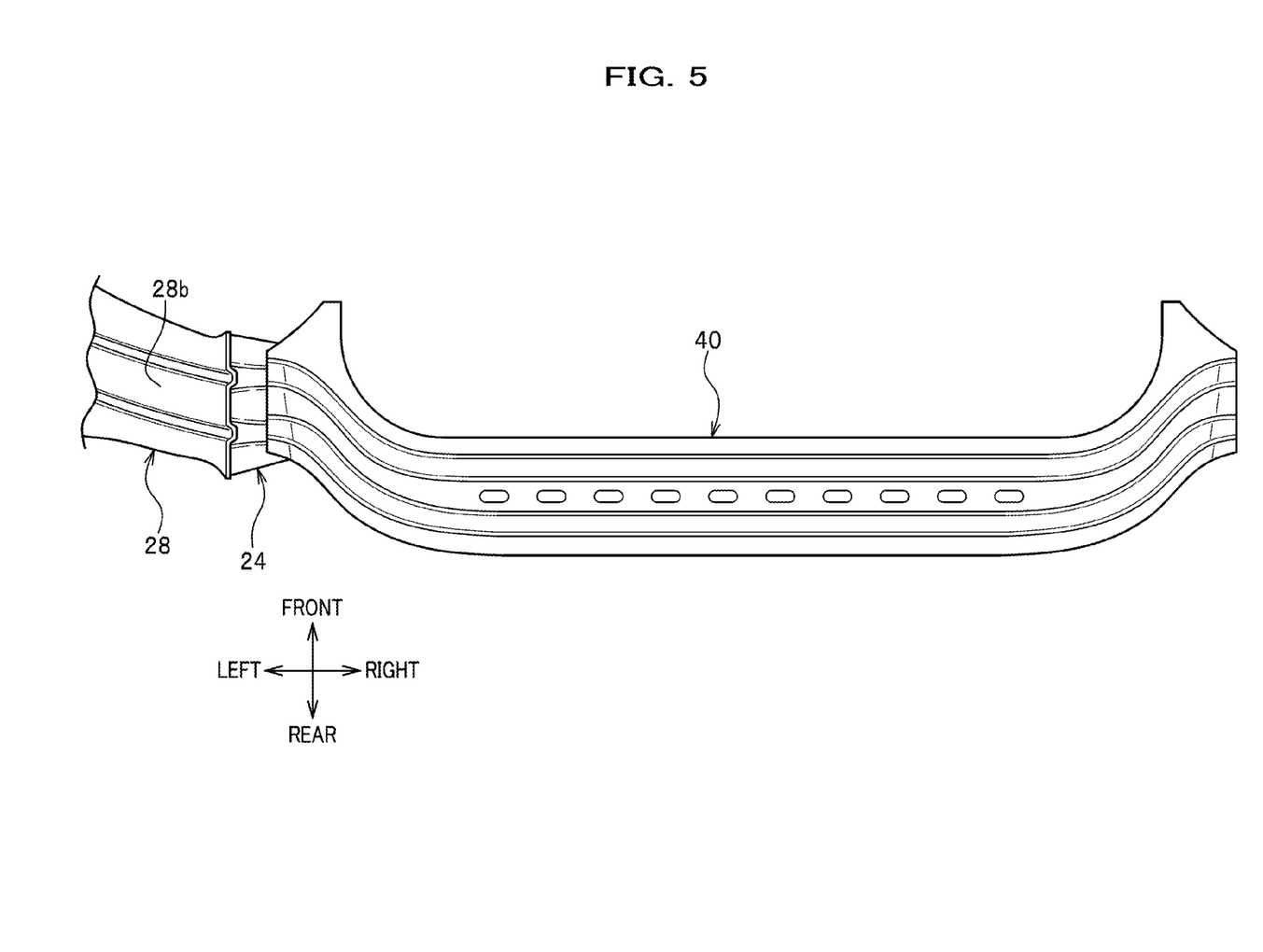
FIG. 5 is a top view of a center pillar, a gusset, and a roof arch seen from the top.

Further, as shown in FIG. 5, when the vehicle (vehicle body) is seen from the top, the pillar inner 28*b* of the center pillar 28, the gusset 24, and the roof arch 40 are disposed at positions overlapping with each other in the vehicle width direction. Note that FIG. 5 is a top view of the pillar inner 28*b*, the gusset 24, and the roof arch 40 seen from the top without the side outer panel 32, the rail outer 36, and the rail inner 34 constituting the rail member 12, the pillar outer 28*a*, and the roof panel 38 on the vehicle 10.

The vehicle 10 having the structure for upper part of vehicle body according to the present embodiment is basically constructed as described above. Next, the actions and the effects thereof will be described.

In the present embodiment, the roof arch 40 and the roof stiffener 44 joined to each other form the first closed cross section 48, while the rail inner 34 of the side rail member 12, the outer wall 44b and the outer flange 44d of the roof stiffener 44, and the gusset 24 form the second closed cross section 52.

In the present embodiment, the first closed cross section 48 and the second closed cross section 52 has a relation that these closed cross sections are disposed adjacent to each other along the vehicle width direction. In the load transmission in the vehicle width direction between the side rail member 12 and the roof member 14, a load is transmitted through the two adjacent closed cross sections. As a result, the present embodiment enhances the load transmission efficiency in the vehicle width direction, making it possible to increase the stiffness and the strength of the upper part of the vehicle body.

Specifically, this is because both of the two closed cross sections including the first closed cross section 48 and the second closed cross section 52 transmit a load to each other, making it possible to increase the number of load transmission paths as well as the load transmission area. Note that although a closed cross section basically has high stiffness and strength, providing two closed cross sections adjacent to each other can further increase the stiffness and the strength.

Moreover, in the present embodiment, it is no longer necessary to provide a bead part having a recessed groove as in the conventional technique, and the gusset 24 is not directly connected to the roof panel 38 constituting the design surface. Accordingly, it is possible to ensure the stiffness and the strength at a corner portion inside the vehicle compartment where the roof member 14 is connected to the center pillar 28, without deteriorating the design.

Further, in the present embodiment, by forming the third closed cross section 54 overlapping with the second closed cross section 52 in the vehicle up-down direction, a load is transmitted in the vehicle width direction between the side rail member 12 and the roof member 14 through the first closed cross section 48, the second closed cross section 52, and the third closed cross section 54. As a result, the present embodiment further enhances the load transmission efficiency in the vehicle width direction, making it possible to further increase the stiffness and the strength of the upper part of the vehicle body.

Furthermore, in the present embodiment, the first closed cross section 48 and the second closed cross section 52 has the relation that the closed cross sections are disposed adjacent to each other in the vehicle width direction, and the third closed cross section 54 has a relation thereto that the third closed cross section 54 is disposed to overlap with the first closed cross section 48 and the second closed cross section 52 in the vehicle up-down direction. With such positional relations that the first closed cross section 48, the second closed cross section 52, and the third closed cross section 54 are adjacent to each other or overlap with each other in the up-down direction, efficient load transmissions are possible among the multiple closed cross sections, and the stiffness and the strength of the upper part of the vehicle body can be further increased.

Furthermore, in the present embodiment, by forming the fourth closed cross section 56 adjacent to the second closed cross section 52 in the vehicle width direction, a load is transmitted in the vehicle width direction between the side rail member 12 and the roof member 14 through the first closed cross section 48, the second closed cross section 52, and the fourth closed cross section 56 which are adjacent to each other in the vehicle width direction. As a result, the present embodiment enhances the load transmission efficiency in the vehicle width direction, making it possible to further increase the stiffness and the strength of the upper part of the vehicle body.

Furthermore, in the present embodiment, there is a positional relation as shown in FIG. 5 that the center pillar 28, the gusset 24, and the roof arch 40 overlap with each other in the vehicle width direction when seen from the top, so that the center pillar 28 overlaps with the first to the fourth closed cross sections 48, 52, 54, and 56 in the vehicle width direction. As a result, the present embodiment enhances the load transmission efficiency in the vehicle width direction from the center pillar 28 through the side rail member 12 to the roof member 14, making it possible to further increase the stiffness and the strength of the side part and the upper part of the vehicle body.

Furthermore, in the present embodiment, for example, a side impact load inputted to the center pillar 28 can be efficiently transmitted to the upper part of the vehicle body, thus enhancing the side impact performance. Furthermore, for example, a rollover load inputted to the roof member 14 can be efficiently transmitted to the side part of the vehicle body, thus enhancing the rollover performance. Furthermore, for example, when the vehicle turns a corner, a deformation load (deformation mode) or the like inputted to the center pillar 28 and the roof member 14 can be spread to each of the upper part and the side part of the vehicle body, thus enhancing the deformation mode performance.

As has been described above, in the present embodiment, it is possible to obtain a structure for upper part of vehicle body capable of ensuring the stiffness and the strength at the corner portion inside the vehicle compartment where the roof member 14 is connected to the center pillar 28 with a simple structure using the gusset 24, without deteriorating the design.

REFERENCE SIGNS LIST

10: Vehicle
12: Side Rail Member
14: Roof Member
28: Center Pillar (Pillar)
34: Rail Inner
36: Rail Outer
38: Roof Panel
38a: Outer End Portion (of Roof Panel) in Vehicle Width Direction
40: Roof Arch
40a: Arch Main Body
40b: Arch Curved Portion
40c: Arch Connection Portion
42: Outer End Portion (of Roof Arch) in Vehicle Width Direction
44: Roof Stiffener
44a: Lower Wall
44b: Outer Wall
44c: Inner Wall
44d: Outer Flange
44e: Inner Flange
45: Hat-Shaped Cross-Sectional Portion
48: First Closed Cross Section
52: Second Closed Cross Section
54: Third Closed Cross Section
56: fourth Closed Cross Section

The invention claimed is:
1. A structure for upper part of vehicle body comprising:
a pair of right and left side rail members extending in a vehicle front-rear direction;

a roof member having right and left end portions in a vehicle width direction supported by the pair of side rail members respectively; and gussets connected at one ends thereof to the respective side rail members, extended from the one ends upwardly and inwardly in the vehicle width direction, and connected at the other ends thereof to the roof member, wherein the roof member includes a roof panel constituting a design surface, a roof arch disposed below the roof panel and extending in the vehicle width direction between the pair of side rail members, and roof stiffeners disposed below the roof arch and disposed on inner sides of the respective side rail members in the vehicle width direction to extend in the vehicle front-rear direction along the respective side rail members, the roof stiffeners being connected to outer end portions of the roof arch in the vehicle width direction and constituting a first closed cross section, the other end of each gusset is connected to the roof stiffener, forming a second closed cross section adjacent to the first closed cross section, each roof stiffener has a hat-shaped cross-sectional portion formed of:

a lower wall facing the roof panel in an up-down direction;

an outer wall and an inner wall raised upwardly from the lower wall and facing each other in the vehicle width direction;

an outer flange extending from an upper end of the outer wall outwardly in the vehicle width direction; and an inner flange extending from an upper end of the inner wall inwardly in the vehicle width direction, the outer flange of the roof stiffener is connected to an outer end portion of the roof panel in the vehicle width direction, the roof arch has:

an arch main body connected to a lower surface of the roof panel;

an arch curved portion formed by downwardly curving a portion of the arch main body, the portion being inward in the vehicle width direction of the outer end portion of the roof panel in the vehicle width direction; and an arch connection portion extending from a lower end of the arch curved portion outwardly in the vehicle width direction and connected to the outer flange of the roof stiffener, and the roof panel, the arch curved portion and the arch connection portion of the roof arch, and the outer flange of the roof stiffener form a third closed cross section overlapping with the second closed cross section in the up-down direction of the vehicle.

2. The structure for upper part of vehicle body according to claim 1, wherein the third closed cross section is formed to overlap with the first closed cross section in the up-down direction of the vehicle with the roof arch therebetween.

3. The structure for upper part of vehicle body according to claim 1, wherein each of the side rail members has:

a rail inner connected to the one end of the gusset; and a rail outer connected to an outer side of the rail inner in the vehicle width direction, and the rail inner and the rail outer form a fourth closed cross section adjacent to the second closed cross section.

4. The structure for upper part of vehicle body according to claim 1, further comprising a pillar extending in the up-down direction of the vehicle and having an upper end connected to each of the side rail members, wherein the pillar is disposed at a position overlapping with the gusset and the roof arch in the vehicle width direction in a top view of a vehicle body.

\* \* \* \* \*